US008947858B2

(12) United States Patent
Djebara et al.

(10) Patent No.: US 8,947,858 B2
(45) Date of Patent: Feb. 3, 2015

(54) CRIMPED LEADWIRE FOR IMPROVED CONTACT WITH ANODES OF A SOLID ELECTROLYTIC CAPACITOR

(75) Inventors: Lotfi Djebara, Paris (FR); Jiri Kobza, Rudoltice (CZ)

(73) Assignee: AVX Corporation, Fountain Inn, SC (US)

( * ) Notice: Subject to any disclaimer, the term of this patent is extended or adjusted under 35 U.S.C. 154(b) by 108 days.

(21) Appl. No.: 13/454,370

(22) Filed: Apr. 24, 2012

(65) Prior Publication Data

US 2013/0279078 A1    Oct. 24, 2013

(51) Int. Cl.
    *H01G 9/00*      (2006.01)
(52) U.S. Cl.
    USPC .......................... 361/523; 361/528; 29/25.03
(58) Field of Classification Search
    USPC .......................... 361/523, 528, 540; 29/25.03
    See application file for complete search history.

(56) References Cited

U.S. PATENT DOCUMENTS

| | | | |
|---|---|---|---|
| 3,345,545 | A | 10/1967 | Bourgault et al. |
| 4,945,452 | A | 7/1990 | Sturmer et al. |
| 5,949,639 | A | 9/1999 | Maeda et al. |
| 6,191,936 | B1 | 2/2001 | Webber et al. |
| 6,447,570 | B1 | 9/2002 | Pozdeev-Freeman |
| 6,665,172 | B1 * | 12/2003 | Kim et al. ............ 361/523 |
| 7,116,548 | B2 | 10/2006 | Satterfield, Jr. et al. |
| 7,594,937 | B2 | 9/2009 | Amita et al. |
| 7,787,235 | B2 * | 8/2010 | Fujita et al. ............ 361/528 |
| 7,929,274 | B2 | 4/2011 | Reed et al. |
| 8,066,783 | B2 | 11/2011 | Takeda |
| 2005/0237698 | A1 | 10/2005 | Postage et al. |
| 2009/0103243 | A1 | 4/2009 | Mizukoshi et al. |

FOREIGN PATENT DOCUMENTS

| | | |
|---|---|---|
| JP | 5718317 A | 1/1982 |
| WO | WO 9849356 A1 | 11/1998 |
| WO | WO 2005106905 A1 | 11/2005 |
| WO | WO 2006057455 A1 | 6/2006 |

OTHER PUBLICATIONS

Hintz et al., "Anode Lead Wire Pre-Treatments for Improved Lead Wire Bonding in Tantalum Capacitor Anodes Processed by De-Oxidation/Sintering," CARTS USA, Mar. 15-18, 2010, New Orleans, Louisiana, 13 pages.

Vasina et al., "Failure Modes of Tatalum Capacitors Made by Different Technologies," CARTS USA, Mar./Apr. 2001, 6 pages.

(Continued)

*Primary Examiner* — Dion R Ferguson
(74) *Attorney, Agent, or Firm* — Dority & Manning, P.A.

(57) ABSTRACT

A capacitor containing a solid electrolytic capacitor element that includes a sintered porous anode body and an anode lead assembly is provided. The lead assembly is electrically connected to the anode body for connection to an anode termination. The lead assembly contains at least a first lead wire comprising at least one notch that is located on an embedded portion of the first lead wire. The at least one notch can be formed by crimping the lead wire prior to embedding the lead wire within the anode body. The at least one lead wire is embedded within the anode body and extends from a surface of the anode body in a longitudinal direction. The resulting geometry of the lead wire increases the points of contact between the anode body and the lead wire after post-sintering shrinkage of the anode body to improve the electrical capabilities of the solid electrolytic capacitor.

15 Claims, 5 Drawing Sheets

(56) References Cited

OTHER PUBLICATIONS

Related U.S. Patent Application Form.
U.S. Appl. No. 13/454,360, Djebara et al., filed Apr. 24, 2012, Solid Electrolytic Capacitor Containing Multiple Sinter Bonded Anode Leadwires.
Abstract of Japanese Patent—JP2006295075, Oct. 26, 2006, 2 pages.
Abstract of Japanese Patent—JP2004253501, Sep. 9, 2004, 2 pages.
Abstract of Japanese Patent—JP2004281619, Oct. 7, 2004, 2 pages.
Abstract of Japanese Patent—JP2005033097, Feb. 3, 2005, 2 pages.
Abstract of Japanese Patent—JP2008187091, Aug. 14, 2008, 2 pages.
Search Report for GB1301114.3 dated May 9, 2013, 4 pages.

* cited by examiner

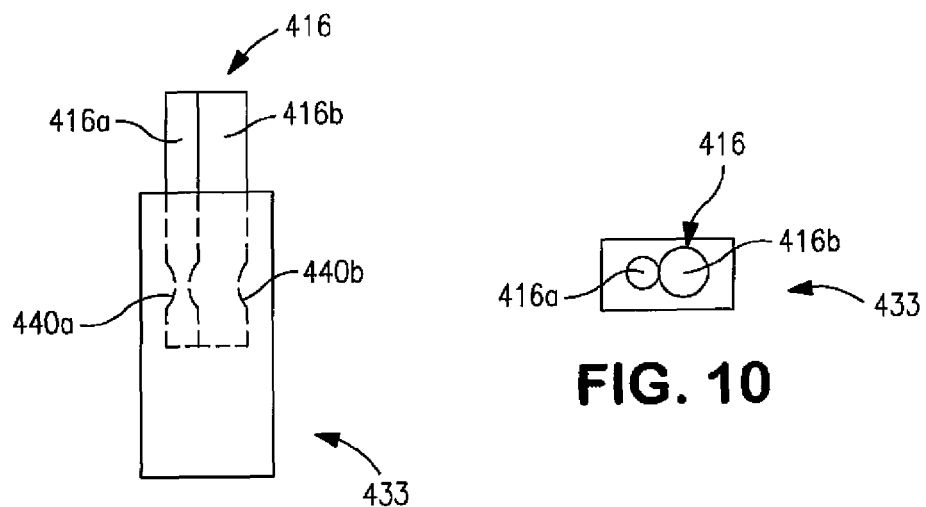
FIG. 9
FIG. 10
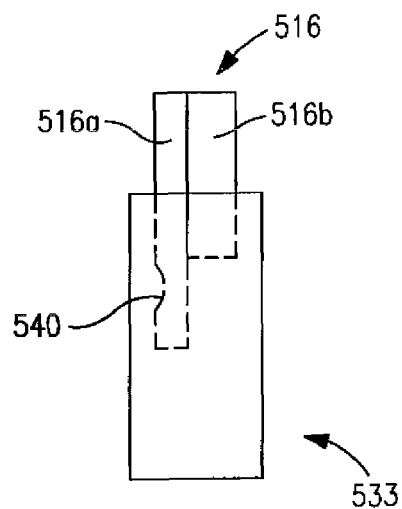
FIG. 11

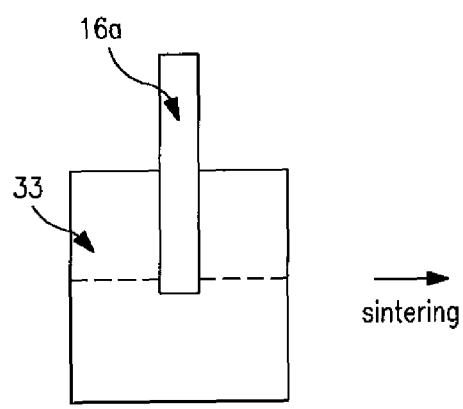
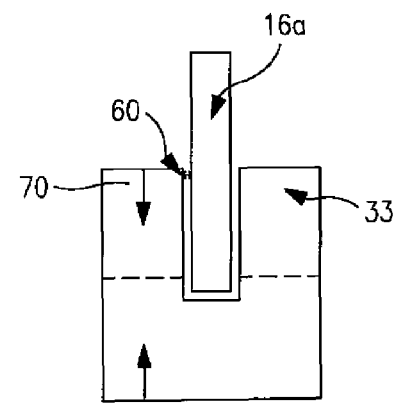
FIG. 12a  FIG. 12b
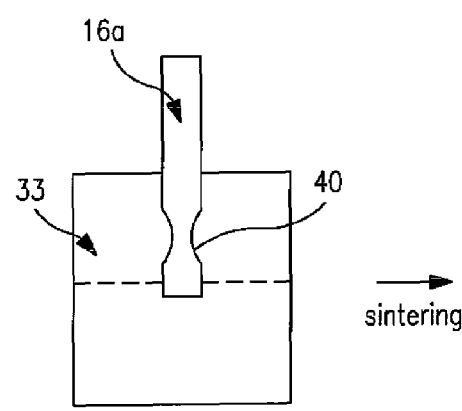
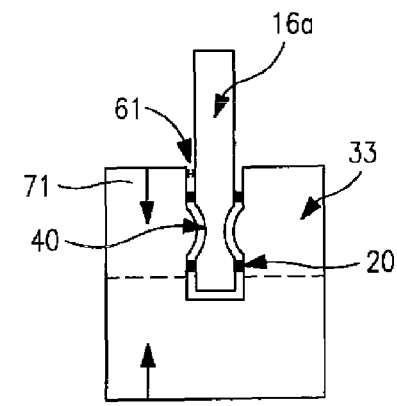
FIG. 13a  FIG. 13b

CRIMPED LEADWIRE FOR IMPROVED CONTACT WITH ANODES OF A SOLID ELECTROLYTIC CAPACITOR

BACKGROUND OF THE INVENTION

Solid electrolytic capacitors (e.g., tantalum capacitors) have been a major contributor to the miniaturization of electronic circuits and have made possible the application of such circuits in extreme environments. The anode of a typical solid electrolytic capacitor includes a porous anode body, with a lead wire extending beyond the anode body and connected to an anode termination of the capacitor. The anode can be formed by first pressing a tantalum powder into a pellet that is then sintered to create fused connections between individual powder particles. One problem with many conventional solid electrolytic capacitors is that upon sintering, such powders tend to shrink away and separate from an embedded lead wire. Typically, the lead wire is mostly cylindrically-shaped with a smooth surface, making connection to the tantalum particles of the pellet more difficult. In fact, on a straight lead wire, it is difficult to find any points of contact between the lead wire and the powder particles. More specifically, the anode body shrinks diametrically towards the midpoint of the anode body, whereas the inner diameter of the anode body (surrounding the lead wire) initially increases. This shrinkage greatly reduces the degree to which the lead wire is bonded to the particles of the anode body, thereby increasing equivalent series resistance (ESR) and decreasing electrical capabilities of the capacitor. The same is true laterally, where the anode body will shrink towards the midpoint and away from any contact with the lead wire.

While several efforts have been made to improve the connection between the anode body and anode lead wire, these efforts involve additional processing steps that can be disadvantageous from a manufacturing standpoint. For example, U.S. Patent Application Publication No. 2010/0274337 to Hintz, et al. describes the additional step of sintering a metal powder onto a portion of a lead wire to form a connection region at a temperature higher than that used for the de-oxidation sintering process. Additionally, U.S. Pat. No. 6,447,570 to Pozdeev-Freeman describes annealing at temperatures above the temperature used for de-oxidation to improve bonding of the anode body to the lead wire, which can contaminate and degrade the annealing furnace, or welding a lead wire to a pre-sintered anode body then de-oxidizing the composite structure.

As such, a need currently exists for an improved solid electrolytic capacitor that increases the points of contact between the lead wire and the anode body, thereby significantly improving electrical capabilities by achieving ultralow ESR levels.

SUMMARY OF THE INVENTION

In accordance with one embodiment of the present invention, a solid electrolytic capacitor is disclosed that comprises a capacitor element. The capacitor element comprises a sintered, porous anode body. A lead assembly is embedded within the anode body. The lead assembly comprises a first lead wire that has at least one notch that is located on an embedded portion of the first lead wire. The first lead wire extends from a surface of the anode body in a longitudinal direction. A dielectric layer overlies the sintered porous anode body, and a cathode overlies the dielectric layer that includes a solid electrolyte.

In accordance with another embodiment of the present invention, a method for forming a sintered, porous anode body is disclosed. The method comprises forming at least one notch on a portion of a first lead wire of an anode lead assembly, embedding the anode lead assembly within a powder formed from a valve metal composition such that the portion of the wire containing the at least one notch is embedded within the powder; compacting the powder around the lead assembly; and sintering the compacted powder and the lead assembly to form a porous anode body.

Other features and aspects of the present invention are set forth in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 9 is a top view of another embodiment of the electrolytic capacitor of the present invention;

FIG. 10 is a frontal view of another embodiment of the electrolytic capacitor of the present invention;

FIG. 11 is a top view of another embodiment of the electrolytic capacitor of the present invention;

FIG. 12 is a top view comparison of an embodiment of the electrolytic capacitor according to the prior art before and after sintering; and FIG. 13 is a top view comparison of an embodiment of the electrolytic capacitor according to the present invention before and after sintering.

Figure 1:
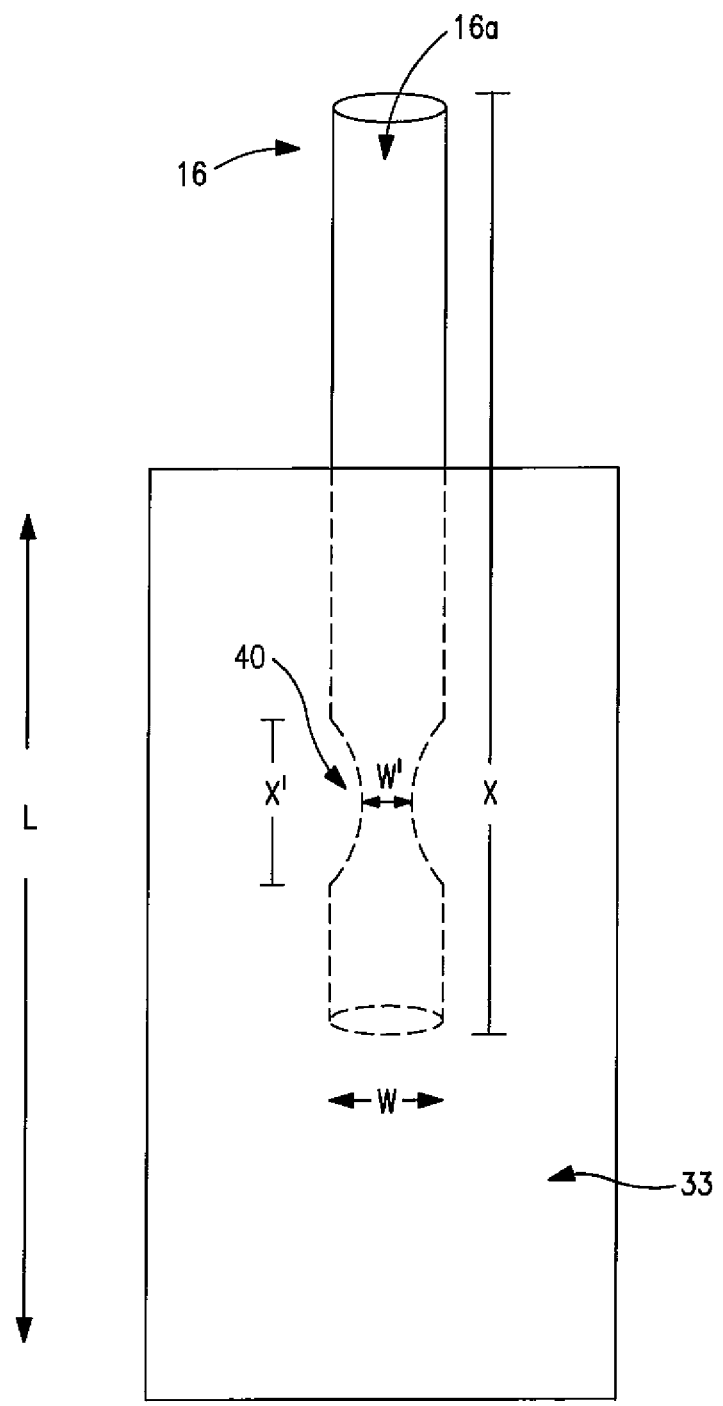
FIG. 1 is a top view of one embodiment of the electrolytic capacitor of the present invention showing the lead assembly's dimensions.

Repeat use of reference characters in the present specification and drawings is intended to represent the same or analogous features or elements of the present invention.

DETAILED DESCRIPTION OF REPRESENTATIVE EMBODIMENTS

It is to be understood by one of ordinary skill in the art that the present discussion is a description of exemplary embodiments only, and is not intended to limit the broader aspects of the present invention.

Generally speaking, the present invention is directed to a capacitor containing a solid electrolytic capacitor element that includes a sintered porous anode body. An anode lead assembly can be electrically connected to the anode body for connection to an anode termination. The lead assembly can be embedded within the anode body and can extend from a surface therefrom in a longitudinal direction. The lead assembly itself may contain a first lead wire comprising at least one notch that is located on the embedded portion of the wire, where the notch functions to increase contact between the first lead wire and the anode body upon sintering, which significantly improves the capacitor's electrical parameters.

Figure 2:
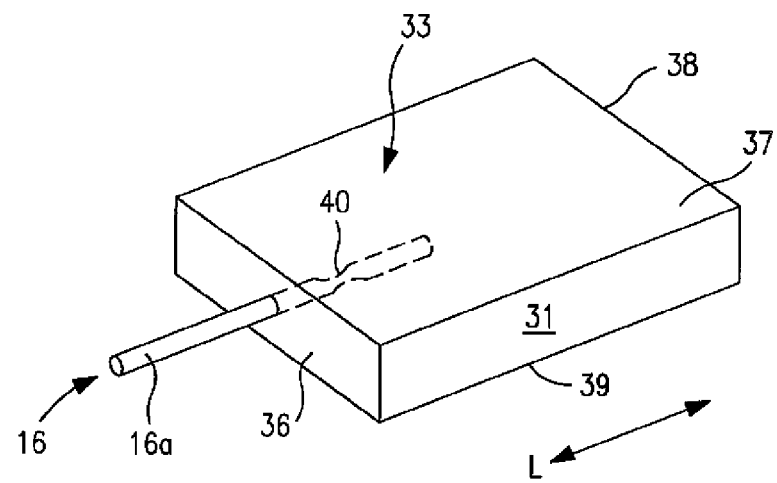
FIG. 2 is perspective view of one embodiment of the electrolytic capacitor of the present invention.
Figure 3:
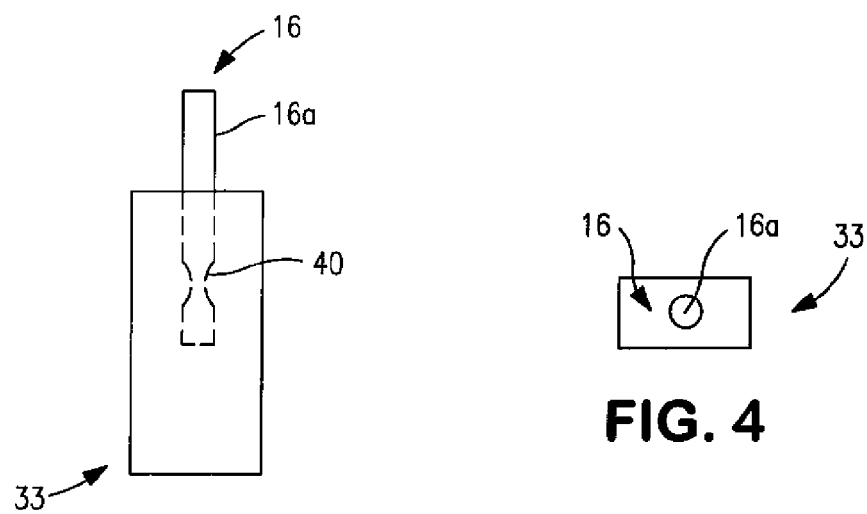
FIG. 3 is a top view of the electrolytic capacitor of FIG. 2.
Figure 4:
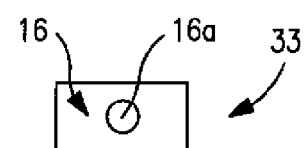
FIG. 4 is a frontal view of the electrolytic capacitor of FIG. 2.

Referring to FIGS. 1-4, one particular embodiment of an anode that is formed from a porous anode body 33 and an anode lead assembly 16 is shown. Generally, FIG. 1 is a top view of the porous anode body 33 that is formed around anode lead assembly 16 and shows the dimensions of the lead assembly 16. Meanwhile, FIG. 2 shows a perspective view of the anode, FIG. 3 shows a top view of the anode of FIG. 2, and FIG. 4 shows a frontal view of the anode of FIG. 2.

In the particular embodiment shown in FIGS. 1-4, the porous anode body 33 is in the shape of a rectangular pellet having an upper surface 37, a lower surface 39, a front surface 36, a rear surface 38, a first side surface 31, and a second side surface (not shown). In addition to having a rectangular shape, the anode may be a cubed, cylindrical, circular, or any other geometric shape. The anode may also be "fluted" in that it may contain one or more furrows, grooves, depressions, or indentations to increase the surface to volume ratio to minimize ESR and extend the frequency response of the capacitor. Such "fluted" anodes are described, for instance, in U.S. Pat. No. 6,191,936 to Webber, et al.; U.S. Pat. No. 5,949,639 to Maeda, et al.; and U.S. Pat. No. 3,345,545 to Bourqault et al., as well as U.S. Patent Application Publication No. 200510270725 to Hahn, et al., all of which are incorporated herein in their entirety by reference thereto for all purposes.

In addition to a porous anode body 33, the anode of the present disclosure also includes an anode lead assembly 16 that allows for an electrical connection to be made with the capacitor. The anode lead assembly includes at least one lead wire, such as first lead wire 16a. Generally speaking, as shown in FIG. 2, the anode lead assembly 16 extends from the front surface 36 of the porous anode body 33 in a longitudinal direction L. It should be understood, however, that the lead assembly 16 may also extend from any other surface of the porous anode body 33. Furthermore, if there are multiple lead wires, the wires need not extend from a common surface of the porous body.

Referring now to FIG. 1, the lead assembly 16 can include a first lead wire 16a with length X and width (thickness) W. The lead wire(s), such as first lead wire 16a, disclosed herein may possess any desired cross-sectional shape, such as circular, elliptical, square, rectangular, etc. The size of the first lead wire 16a may generally vary depending on the overall size of the anode body 33. In most embodiments, the ratio of the length X of the lead wire(s) in the longitudinal direction L to the width W (or thickness) of the wire(s) ("aspect ratio") will vary in some embodiments from about 2 to about 150, in some embodiments from about 5 to about 100, and in other embodiments from about 15 to about 90. For example, the wire(s) may have a width or thickness of from about 20 micrometers to about 1000 micrometers, in some embodiments from about 50 micrometers to about 800 micrometers, and in some embodiments from about 100 micrometers to about 600 micrometers. Using the widest range for the aspect ratio, this corresponds to the lead wire(s), such as first lead wire 16a, having a length X of from about 40 micrometers to about 150 millimeters, in some embodiments from about 100 micrometers to 120 millimeters, and in some embodiments from about 200 micrometers to about 90 millimeters.

FIG. 1 also shows a notch 40 that has been formed in an embedded portion of the first lead wire 16a, where the notch has a length X' that extends along a portion of length X of the first lead wire 16a and a width (thickness) W' that encompasses a portion of width W of the first lead wire 16a. While, as is shown in FIG. 11, a notch 540 can be formed so that one side of the wire is smooth and continuous with the rest of that side of the wire and the other side is rough (e.g., the geometry of the wire has been altered only on one side), a notch can be formed so that both sides of the lead wire at the notch are rough (e.g., the geometry of the wire has been altered on both sides). For example, the notch 40 shown in FIGS. 1-3 is formed in such a manner that both sides of first lead wire 16a at the notch have been altered to form an elliptical-shaped indentation in the first lead wire. This rough surface geometry is in contrast to the remainder of first lead wire 16a, which has a smooth surface with no indentations. As the notch exhibits elliptical geometry on both sides of the lead wire, there are at least two areas on the lead wire where increased points of contact can occur. As a result of the increased points of contact, as shown in FIG. 13 discussed in more detail below, the anode can exhibit improved electrical capabilities.

Returning to FIGS. 1-3, the notch 40 can be formed by various methods, including, but not limited to, crimping, shaping, pinching, twisting, or the like. Moreover, a notch is not limited to a certain shape, and the notch can be rectangular, circular, elliptical, triangular, U-shaped, V-shaped, or any other suitable shape. The notch 40 can be formed in any manner known to one of ordinary skill in the art, such as with a crimping tool. When a lead wire is crimped, the notch can be formed by, for example, the deformation of the first lead wire 16a by applying pressure to the first lead wire via the crimping tool. As noted above, based on the geometry of the contact points of the crimping tool, the notch formed on the first lead wire 16a can be rectangular, circular, elliptical, triangular, U-shaped, V-shaped or any other suitable shape.

Regardless of the manner in which the notch is formed, the ratio of the length X of the lead wire 16a to the length X' of the notch 40 will vary in some embodiments from about 1.5 to about 30, in some embodiments from about 2 to about 15, and in other embodiments from about 5 to 10. Thus, the lead wire can have a length that is from about 1.5 times the length of the notch to about 30 times the length of the notch. For example, if the lead wire 16a has a length X of about 50 millimeters, the notch may have a length X' of about 2 millimeters to about 30 millimeters, in some embodiments of about 4 millimeters to about 25 millimeters, and in some embodiments of about 5 millimeters to about 10 millimeters.

Additionally, regardless of the manner in which the notch 40 is formed, the ratio of the width (or thickness) W of the lead wire 16a to the width (or thickness) W' of the notch 40 will vary in some embodiments from about 1.05 to about 7, in some embodiments from about 1.25 to about 5, and in other embodiments from about 1.5 to about 3. Thus, the lead wire can have a width that is from about 1.05 times the width of the notch to about 7 times the width of the notch. For example, if the lead wire 16a has a width W of about 500 micrometers, the notch may have a width W' of about 75 micrometers to about 475 micrometers, in some embodiments of about 100 micrometers to about 400 micrometers, and in some embodiments of about 175 micrometers to about 325 micrometers.

Figure 5:
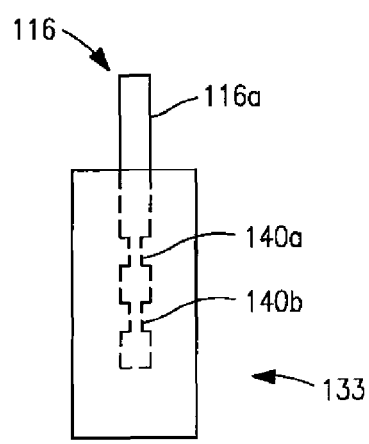
FIG. 5 is a top view of another embodiment of the electrolytic capacitor of the present invention.

Regardless of the dimensions of the lead wires, the number of lead wires employed or the geometry of the notches on the lead wires, the lead wire(s) may be formed from an electrically conductive material, such as tantalum, niobium, nickel, aluminum, hafnium, titanium, etc., as well as oxides and/or nitrides thereof (e.g., niobium oxide). Moreover, while only one notch with one rough surface (e.g., where an indentation that is rectangular, circular, elliptical, triangular, U-shaped, V-shaped or any other suitable shape is present on only one side of the lead wire) may be employed to create improved points of contact between the anode body and the lead wire, if desired, more than one notch may be employed in a lead wire, such as 2, 3, 4, or even more. (See e.g. FIGS. 5 and 8). For example, in FIG. 5, lead wire 116a contains notches 140a and 140b, where the notches 140a and 140b are formed by altering the geometries of both sides of the lead wire 116a so that each notch includes two indentations in the lead wire. Although the notches in FIG. 5 are rectangular-shaped, the notches can be formed in any suitable shape. See, for example, FIG. 8, where notches 340a, 340b, 341a, and 341b are triangular or V-shaped. Moreover, while notches 140a and 140b have been formed so that both sides of the lead wire are indented, the indentations or altered geometries can be located on only one side of the lead wire as shown in FIG. 9 at notch 440b and FIG. 11 at notch 540. The notches can also be located around the entire periphery of the embedded portion of the lead wire, along a portion or the entire length of the embedded portion of the lead wire, or in any other suitable configuration.

Figure 6:
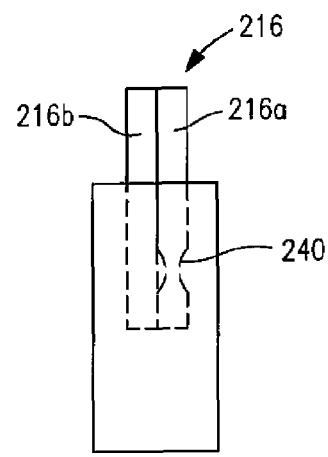
FIG. 6 is a top view of another embodiment of the electrolytic capacitor of the present invention.
Figure 7:
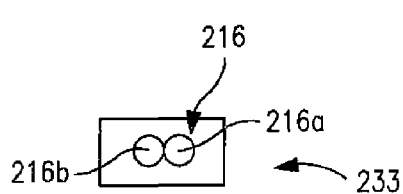
FIG. 7 is a frontal view of the electrolytic capacitor of FIG. 6.
Figure 8:
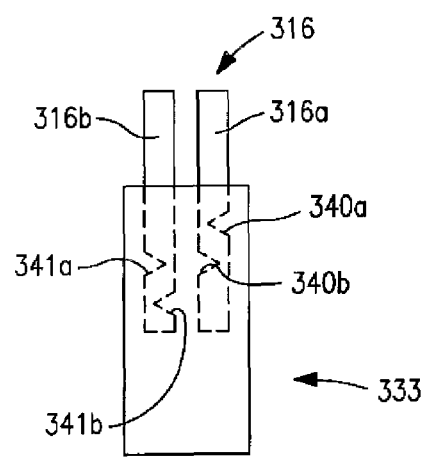
FIG. 8 is a top view of another embodiment of the electrolytic capacitor of the present invention.

In addition to one lead wire containing more than one notch, as is shown in FIG. 5, more than one lead wire may be employed, and 2, 3, 4, or even more lead wires may be embedded within the porous anode body. (See FIGS. 6-11). Even if multiple lead wires are utilized, only one lead wire need include a notch in order to improve the connections between the anode lead assembly and the porous anode body, although notches can be present on more than one of the lead wires and each lead wire may contain more than one notch. As shown in FIGS. 6 and 7, the two lead wires 216a and 216b may be located directly next to each other and sinter bonded, although as shown in FIG. 8, it is not required that the lead wires be located directly next to each other. FIG. 6 shows lead wires 216a and 216b, with first lead wire 216a comprising notch 240 and second lead wire 216b being conventionally smooth without a notch. FIG. 7 is a frontal view of the embodiment of FIG. 6 showing the two lead wires 216a and 216b positioned directly next to each other.

As noted, the lead wires may be separated as in conventional methods (see FIG. 8) or may be bonded or fused together during sintering of the porous anode body (i.e., "sinter bonded") (see FIGS. 6 and 7). The nature of the bond may vary, such as metallurgical, covalent, electrostatic, etc. Although not required, sinter bonding of the wires can further reduce the path length and resistance for current flow within the porous anode body, and thus reduce ESR. In addition, the sinter-bonded wires can also result in a lead assembly that is more robust and mechanically stable, which further improves the electrical performance of the resulting capacitor.

FIG. 8 shows a conventional capacitor configuration, such as where multiple wires are spaced apart and are not directly next to each other as in FIGS. 6 and 7. Also, as shown in FIG. 8, multiple lead wires 316a and 316b can comprise multiple notches (340a and 340b in first lead wire 316a; 341a and 341b in second lead wire 316b). Further, the embodiment disclosed in FIG. 8 demonstrates a different notch geometry, whereby the notches are triangular or V-shaped and extend along the embedded portion of each lead wire on either side.

If multiple lead wires are employed, the lead wires can have the same approximate size (e.g., width or thickness) as shown in FIGS. 6-8, or at least one of the wire(s) may have a size that is greater than that of the other wire(s), as shown in FIGS. 9-11. The ratio of the width or thickness of the larger wire to the width of the smaller wire may be, for example, in some embodiments from about 1 to about 10, in other embodiments from about 1.5 to about 8, and in still other embodiments from about 2 to about 5. The larger-sized wire can be used as the location of electrical connection to the anode termination. This, in turn, allows the smaller-sized wire to be employed primarily to increase the number or degree of contacts with the porous anode body and to enhance mechanical stability. Through the use of different, yet sinter-bonded, lead wires in this manner, at least a portion of the lead assembly can avoid the damage that is often encountered during electrical connection to the anode termination, such as during laser welding.

For example, referring to FIG. 9, one particular embodiment of a lead assembly 416 for a porous anode body 433 is shown that employs a first lead wire 416a that is smaller in width or thickness (e.g., diameter) than a second lead wire 416b. Further, in this particular embodiment, the embedded portions of the first lead wire 416a and the second lead wire 416b comprise notches 440a and 440b, respectively. The width or thickness of the larger second lead wire 416b may range from about 250 micrometers to about 1000 micrometers, in some embodiments from about 300 micrometers to about 800 micrometers, and in some embodiments, from about 450 micrometers to about 550 micrometers. Likewise, the width or thickness of the smaller first lead wire 416a may, for example, range from about 50 micrometers to about 250 micrometers, in some embodiments from about 100 micrometers to about 225 micrometers, and in some embodiments, from about 120 micrometers to about 220 micrometers. FIG. 10 is a frontal view of FIG. 9 and shows the difference in size/width between first lead wire 416a and second lead wire 416b.

While in the embodiments illustrated in FIGS. 6-9 each of the wires has the same length, this is by no means required. Referring to FIG. 11, for example, one particular embodiment of a lead assembly 516 for a porous anode body 533 is shown that employs a first lead wire 516a that is greater in length than a thicker second lead wire 516b. Further, in the embodiment disclosed in FIG. 11, the first lead wire 516a includes at least one notch 540 located on an embedded portion of the wire for improving the electrical connection between the anode body 533 and the lead assembly 516. While no notches are shown on second lead wire 516b, at least one notch can be formed on an embedded portion of the second lead wire 516b as well. Additionally, the second lead wire 516b, while thicker or larger in diameter than the second lead wire 516a, is also shorter in length than the first lead wire 516a, which helps minimize the use of excess material for the thicker second lead wire 516b. The second lead wire 516b can be employed for making the electrical connection to the anode termination, but nevertheless takes advantage of the longer, smaller or thinner in diameter first lead wire 516a to achieve acceptable points of contact with the porous anode body 533. The shorter length of the second lead wire 516b can be achieved by simply trimming one of the wires prior to use. The ratio of the length of the longer first lead wire 516a to the width of the shorter second lead wire 516b may range in some embodiments from about 1 to about 10, in some embodiments from about 1.5 to about 8, and in some embodiments from about 2 to about 5.

Referring now to FIGS. 12 and 13, an embodiment of an anode of the prior art before and after sintering can be compared to an embodiment of the anode of present disclosure before and after sintering. FIG. 12a shows an embodiment of a prior art version of a porous anode body 33 with an embedded first lead wire 16a extending beyond the porous anode body 33 prior to sintering of, for example, tantalum powder, where there are no gaps between the porous anode body 33 and the embedded first lead wire 16a. FIG. 12b then shows the porous anode body 33 and the first lead wire 16a after sintering of, for example, tantalum powder. Note how the porous anode body 33 has shrunk both diametrically 60 and laterally 70 away from the first lead wire 16a. This results in limited contact between the porous anode body 33 and the first lead wire 16a, which increases the ESR and decreases the anode's electrical capabilities.

In contrast to FIG. 12, FIG. 13 shows an embodiment of the present disclosure before and after sintering. FIG. 13a shows an embodiment of a porous anode body 33 of the present invention with an embedded first lead wire 16a comprising at least one notch 40 on an embedded portion of the wire, prior to the sintering of, for example, tantalum powder, where there are no gaps between the porous anode body 33 and the embedded first lead wire 16a with notch 40. FIG. 13b shows the porous anode body 33 and the first lead wire 16a after sintering of, for example, tantalum powder. As shown, the porous anode body 33 has shrunk diametrically 61 and laterally 71 away from the first lead wire 16a, but the notched geometry of the embedded portion of the lead wire 16a has created a non-uniform width of the porous anode body 33. Thus, when shrinkage begins to occur, the larger width of the anode body 33 at notch 40 constrains the porous anode body 33 and prevents it from shrinking completely away from the lead wire 16a. This creates points of contact 20 between the porous anode body 33 and the first lead wire 16a based on compressive forces. The resulting points of contact, in turn, decrease the ESR and increase the anode's electrical capabilities.

While FIG. 13 shows only a single lead wire with an embedded portion having a single-elliptical shaped notch where the first lead wire 16a has been altered on both sides, this is not the only configuration possible. Any shaped notch can be formed where one side or both sides of the lead wire 16a are geometrically altered. In addition, more than one notch can be present along the embedded portion of the lead wire 16a. Moreover, at least a second lead wire can be employed, which can have at least one notch located on an embedded portion of the wire, or it may be conventionally smooth. Regardless of the number of lead wires or the number of notches along the embedded portions of each lead wire, as long as at least one notch exists on one lead wire where one side of the lead wire is indented to form the notch, the points of contact between the anode body 33 and the lead wire(s) can be increased.

As previously mentioned, the lead wires, such as lead wire 16a in FIGS. 1-4, disclosed herein may possess any desired cross-sectional shape, such as circular, elliptical, square, rectangular, etc. Additionally, the size of the lead wire may generally vary depending on the overall size of the anode body. In most embodiments, the ratio of the length of the wire(s) in the longitudinal direction to the width (or thickness) of the wire(s) ("aspect ratio") will vary in some embodiments from about 2 to about 150, in some embodiments from about 5 to about 100, and in other embodiments from about 15 to about 90. For example, the wire(s) may have a width or thickness of from about 20 micrometers to about 1000 micrometers, in some embodiments from about 50 to about 800 micrometers, and in some embodiments from about 100 to about 600 micrometers. If more than one lead wire is used as in FIGS. 6-11, the overall lead assembly may have a width or thickness of from about 50 micrometers to about 2000 micrometers, in some embodiments from about 100 micrometers to about 1500 micrometers, and in some embodiments from about 200 micrometers to about 1000 micrometers.

Moreover, the porous anode body 33 is typically formed from a valve metal composition having a high specific charge, such as about 5,000 μF*V/g or more, in some embodiments about 10,000 μF*V/g or more, in some embodiments about 20,000 μF*V/g or more. As noted above, the lead assembly of the present invention can be particularly useful for "high specific charge" powders, which tend to shrink and pull away from the lead wires during sintering to a greater extent than lower specific charge powders. Such powders typically have a specific charge of from about 20,000 to about 600,000 μF*V/g, in some embodiments from about 25,000 to about 500,000 μF*V/g, in some embodiments from about 30,000 to about 400,000 μF*V/g, in some embodiments from about 35,000 to about 350,000 μF*V/g, and in some embodiments, from about 40,000 to about 300,000 μF*V/g. The valve metal composition contains a valve metal (i.e., a metal that is capable of oxidation) or a valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. For example, the niobium oxide may be $NbO_{0.7}$, $NbO_{1.0}$, $NbO_{1.1}$, and $NbO_2$. In a preferred embodiment, the composition contains $NbO_{1.0}$, which is a conductive niobium oxide that may remain chemically stable even after sintering at high temperatures. Examples of such valve metal oxides are described in U.S. Pat. No. 6,322,912 to Fife; U.S. Pat. No. 6,391,275 to Fife et al.; U.S. Pat. No. 6,416,730 to Fife et al.; U.S. Pat. No. 6,527,937 to Fife; U.S. Pat. No. 6,576,099 to Kimmel, et al.; U.S. Pat. No. 6,592,740 to Fife, et al.; and U.S. Pat. No. 6,639,787 to Kimmel, et al.; and U.S. Pat. No. 7,220,397 to Kimmel, et al., as well as U.S. Patent Application Publication Nos. 2005/0019581 to Schnitter; 2005/0103638 to Schnitter, et al.; 2005/0013765 to Thomas, et al., all of which are incorporated herein in their entirety by reference thereto for all purposes.

To form the anode, a powder of the valve metal composition is generally employed. The powder may contain particles any of a variety of shapes, such as nodular, angular, flake, etc., as well as mixtures thereof. Particularly suitable powders are tantalum powders available from Cabot Corp. (e.g., C255 flake powder, TU4D flake/nodular powder, etc.) and H. C. Starck (e.g., NH175 nodular powder). Although not required, the powder may be agglomerated using any technique known in the art, such as through heat treatment. Prior to forming the powder into the shape of an anode, it may also be optionally mixed with a binder and/or lubricant to ensure that the particles adequately adhere to each other when pressed to form the anode body. The resulting powder may then be compacted to form a pellet using any conventional powder press device. For example, a press mold may be employed that is a single station compaction press containing a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing.

Regardless of its particular composition, the powder is compacted around the anode lead assembly 16 so that at least a portion of the anode lead assembly extends from the compacted porous anode body 33. In one particular embodiment, a press mold may be employed that includes a die having two or more portions (e.g., upper and lower portions). During use, the portions of the die may be placed adjacent to each other so that their walls are substantially aligned to form a die cavity having the desired shape of the anode. Before, during, and/or after loading a certain quantity of powder into the die cavity, the lead wire 16a may be embedded therein. The die may define a single or multiple slots that allow for the insertion of the wires. If more than one lead wire is employed, the lead wires can be placed in close proximity to each other in order to be sinter-bonded, although this is not required. After filling the die with powder and embedding the lead wires therein, the die cavity may then be closed and subjected to compressive forces by a punch. Typically, the compressive forces are exerted in a direction that is either generally parallel or generally perpendicular to the longitudinal axis "L" of the wires. This forces the particles into close contact with the wires and creates a strong wire-to-powder bond.

Any binder/lubricant may be removed after pressing by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes. Thereafter, the porous anode body 33 is sintered to form a porous, integral mass. The pellet is typically sintered at a temperature of from about 1200° C. to about 2000° C., in some embodiments from about 1300° C. to about 1900° C., and in some embodiments, from about 1500° C. to about 1800° C., for a time of from about 5 minutes to about 100 minutes, and in some embodiments, from about 30 minutes to about 60 minutes. If desired, sintering may occur in an atmosphere that limits the transfer of oxygen atoms to the anode. For example, sintering may occur in a reducing atmosphere, such as in a vacuum, inert gas, hydrogen, etc. The reducing atmosphere may be at a pressure of from about 10 Torr to about 2000 Torr, in some embodiments from about 100 Torr to about 1000 Torr, and in some embodiments, from about 100 Torr to about 930 Torr. Mixtures of hydrogen and other gases (e.g., argon or nitrogen) may also be employed.

Once constructed, a dielectric layer may be formed by anodically oxidizing ("anodizing") the sintered anode body. This results in the formation of a dielectric layer that is formed over and/or within the pores of the anode body. For example, a tantalum (Ta) anode may be anodized to tantalum pentoxide ($Ta_2O_5$). Typically, anodization is performed by initially applying a solution to the anode, such as by dipping the anode into an electrolyte. A solvent is generally employed, such as water (e.g., deionized water). To enhance ionic conductivity, a compound may be employed that is capable of dissociating in the solvent to form ions. Examples of such compounds include, for instance, acids, such as described below with respect to the electrolyte. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the anodizing solution. If desired, blends of acids may also be employed.

A current is passed through the anodizing solution to form the dielectric layer. The voltage applied during the dielectric layer formation process controls the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the entire surface of the anode. Of course, other known methods may also be employed, such as pulse or step potentiostatic methods. The voltage at which anodic oxidation occurs typically ranges from about 4 to about 250 V, and in some embodiments, from about 9 to about 200 V, and in some embodiments, from about 20 to about 150 V. During oxidation, the anodizing solution can be kept at an elevated temperature, such as about 30° C. or more, in some embodiments from about 40° C. to about 200° C., and in some embodiments, from about 50° C. to about 100° C. Anodic oxidation can also be performed at ambient temperature or lower. The resulting dielectric layer may be formed on a surface of the anode and within its pores.

The capacitor element also contains a solid electrolyte that functions as the cathode for the capacitor. A manganese dioxide solid electrolyte may, for instance, be formed by the pyrolytic decomposition of manganous nitrate ($Mn(NO_3)_2$). Such techniques are described, for instance, in U.S. Pat. No. 4,945,452 to Sturmer, et al., which is incorporated herein in its entirety by reference thereto for all purposes.

Alternatively, the solid electrolyte may be formed from one or more conductive polymer layers. The conductive polymer(s) employed in such layers are typically π-conjugated and have electrical conductivity after oxidation or reduction, such as an electrical conductivity of at least about 1 μS cm$^{-1}$ after oxidation. Examples of such π-conjugated conductive polymers include, for instance, polyheterocycles (e.g., polypyrroles, polythiophenes, polyanilines, etc.), polyacetylenes, poly-p-phenylenes, polyphenolates, and so forth. Particularly suitable conductive polymers are substituted polythiophenes having the following general structure:

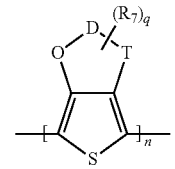

wherein,

T is O or S;

D is an optionally substituted $C_1$ to $C_5$ alkylene radical (e.g., methylene, ethylene, n-propylene, n-butylene, n-pentylene, etc.);

$R_7$ is a linear or branched, optionally substituted $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); optionally substituted $C_5$ to $O_{12}$ cycloalkyl radical (e.g., cyclopentyl, cyclohexyl, cycloheptyl, cyclooctyl, cyclononyl cyclodecyl, etc.); optionally substituted $C_6$ to $O_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); optionally substituted $C_1$ to $C_4$ hydroxyalkyl radical, or hydroxyl radical; and q is an integer from 0 to 8, in some embodiments, from 0 to 2, and in one embodiment, 0; and n is from 2 to 5,000, in some embodiments from 4 to 2,000, and in some embodiments, from 5 to 1,000. Example of substituents for the radicals "D" or "$R_7$" include, for instance, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane and alkoxysilane groups, carboxylamide groups, and so forth.

Particularly suitable thiophene polymers are those in which "D" is an optionally substituted $C_2$ to $C_3$ alkylene radical. For instance, the polymer may be optionally substituted poly(3,4-ethylenedioxythiophene), which has the following general structure:

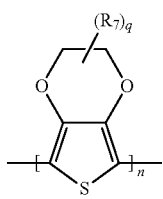

Methods for forming conductive polymers, such as described above, are well known in the art. For instance, U.S. Pat. No. 6,987,663 to Merker, et al., which is incorporated herein in its entirety by reference thereto for all purposes, describes various techniques for forming substituted polythiophenes from a monomeric precursor. The monomeric precursor may, for instance, have the following structure:

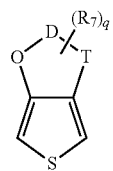

wherein,

T, D, $R_7$, and q are defined above. Particularly suitable thiophene monomers are those in which "D" is an optionally substituted $C_2$ to $O_3$ alkylene radical. For instance, optionally substituted 3,4-alkylenedioxythiophenes may be employed that have the general structure:

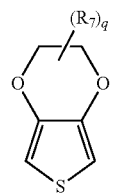

wherein, $R_7$ and q are as defined above. In one particular embodiment, "q" is 0. One commercially suitable example of 3,4-ethylenedioxythiophene is available from Heraeus Clevios under the designation Clevios™ M. Other suitable monomers are also described in U.S. Pat. No. 5,111,327 to Blohm, et al. and U.S. Pat. No. 6,635,729 to Groenendaal, et al., which are incorporated herein in their entirety by reference thereto for all purposes. Derivatives of these monomers may also be employed that are, for example, dimers or trimers of the above monomers. Higher molecular derivatives, i.e., tetramers, pentamers, etc. of the monomers are also suitable for use in the present invention. The derivatives may be made up of identical or different monomer units and used in pure form and in a mixture with one another and/or with the monomers. Oxidized or reduced forms of these precursors may also be employed.

The thiophene monomers are chemically polymerized in the presence of an oxidative catalyst. The oxidative catalyst typically includes a transition metal cation, such as iron(III), copper(II), chromium(VI), cerium(IV), manganese(IV), manganese(VII), or ruthenium(III) cations, and etc. A dopant may also be employed to provide excess charge to the conductive polymer and stabilize the conductivity of the polymer. The dopant typically includes an inorganic or organic anion, such as an ion of a sulfonic acid. In certain embodiments, the oxidative catalyst employed in the precursor solution has both a catalytic and doping functionality in that it includes a cation (e.g., transition metal) and an anion (e.g., sulfonic acid). For example, the oxidative catalyst may be a transition metal salt that includes iron(III) cations, such as iron(III) halides (e.g., $FeCl_3$) or iron(III) salts of other inorganic acids, such as $Fe(ClO_4)_3$ or $Fe_2(SO_4)_3$ and the iron(III) salts of organic acids and inorganic acids comprising organic radicals. Examples of iron (III) salts of inorganic acids with organic radicals include, for instance, iron(III) salts of sulfuric acid monoesters of $C_1$ to $C_{20}$ alkanols (e.g., iron(III) salt of lauryl sulfate). Likewise, examples of iron(III) salts of organic acids include, for instance, iron(III) salts of $C_1$ to $C_{20}$ alkane sulfonic acids (e.g., methane, ethane, propane, butane, or dodecane sulfonic acid); iron (III) salts of aliphatic perfluorosulfonic acids (e.g., trifluoromethane sulfonic acid, perfluorobutane sulfonic acid, or perfluorooctane sulfonic acid); iron (III) salts of aliphatic $C_1$ to $C_{20}$ carboxylic acids (e.g., 2-ethylhexylcarboxylic acid); iron (III) salts of aliphatic perfluorocarboxylic acids (e.g., trifluoroacetic acid or perfluorooctane acid); iron (III) salts of aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); iron (III) salts of cycloalkane sulfonic acids (e.g., camphor sulfonic acid); and so forth. Mixtures of these above-mentioned iron(III) salts may also be used. Iron(III)-p-toluene sulfonate, iron(III)-o-toluene sulfonate, and mixtures thereof, are particularly suitable. One commercially suitable example of iron(III)-p-toluene sulfonate is available from Heraeus Clevios under the designation Clevios™ C.

Various methods may be utilized to form a conductive polymer layer. In one embodiment, the oxidative catalyst and monomer are applied, either sequentially or together, such that the polymerization reaction occurs in situ on the anode part. Suitable application techniques that may include screen-printing, dipping, electrophoretic coating, and spraying may be used to form a conductive polymer coating. As an example, the monomer may initially be mixed with the oxidative catalyst to form a precursor solution. Once the mixture is formed, it may be applied to the anode part and then allowed to polymerize so that the conductive coating is formed on the surface. Alternatively, the oxidative catalyst and monomer may be applied sequentially. In one embodiment, for example, the oxidative catalyst is dissolved in an organic solvent (e.g., butanol) and then applied as a dipping solution. The anode part may then be dried to remove the solvent therefrom. Thereafter, the part may be dipped into a solution containing the monomer.

Polymerization is typically performed at temperatures of from about −10° C. to about 250° C., and in some embodiments, from about 0° C. to about 200° C., depending on the oxidizing agent used and desired reaction time. Suitable polymerization techniques, such as described above, may be described in more detail in U.S. Pat. No. 7,515,396 to Biler. Still other methods for applying such conductive coating(s) may be described in U.S. Pat. No. 5,457,862 to Sakata, et al., U.S. Pat. No. 5,473,503 to Sakata, et al., U.S. Pat. No. 5,729,428 to Sakata, et al., and U.S. Pat. No. 5,812,367 to Kudoh, et al., which are incorporated herein in their entirety by reference thereto for all purposes.

In addition to in situ application, a conductive polymer layer may also be applied in the form of a dispersion of conductive polymer particles. Although the particle size may vary, it is typically desired that the particles possess a small diameter to increase the surface area available for adhering to the anode part. For example, the particles may have an average diameter of from about 1 to about 500 nanometers, in some embodiments from about 5 to about 400 nanometers, and in some embodiments, from about 10 to about 300 nanometers. The $D_{90}$ value of the particles (particles having a diameter of less than or equal to the $D_{90}$ value constitute 90% of the total volume of all of the solid particles) may be about 15 micrometers or less, in some embodiments about 10 micrometers or less, and in some embodiments, from about 1 nanometer to about 8 micrometers. The diameter of the particles may be determined using known techniques, such as by ultracentrifuge, laser diffraction, etc.

The formation of the conductive polymer into a particulate form may be enhanced by using a separate counterion to counteract the positive charge carried by the substituted polythiophene. In some cases, the polymer may possess positive and negative charges in the structural unit, with the positive charge being located on the main chain and the negative charge optionally on the substituents of the radical "R", such as sultanate or carboxylate groups. The positive charges of the main chain may be partially or wholly saturated with the optionally present anionic groups on the radicals "R." Viewed overall, the polythiophenes may, in these cases, be cationic, neutral or even anionic. Nevertheless, they are all regarded as cationic polythiophenes as the polythiophene main chain has a positive charge.

The counterion may be a monomeric or polymeric anion. Polymeric anions can, for example, be anions of polymeric carboxylic acids (e.g., polyacrylic acids, polymethacrylic acid, polymaleic acids, etc.); polymeric sulfonic acids (e.g., polystyrene sulfonic acids ("PSS"), polyvinyl sulfonic acids, etc.); and so forth. The acids may also be copolymers, such as copolymers of vinyl carboxylic and vinyl sulfonic acids with other polymerizable monomers, such as acrylic acid esters and styrene. Likewise, suitable monomeric anions include, for example, anions of $C_1$ to $C_{20}$ alkane sulfonic acids (e.g., dodecane sulfonic acid); aliphatic perfluorosulfonic acids (e.g., trifluoromethane sulfonic acid, perfluorobutane sulfonic acid or perfluorooctane sulfonic acid); aliphatic $C_1$ to $C_{20}$ carboxylic acids (e.g., 2-ethyl-hexylcarboxylic acid); aliphatic perfluorocarboxylic acids (e.g., trifluoroacetic acid or perfluorooctanoic acid); aromatic sulfonic acids optionally substituted by $C_1$ to $C_{20}$ alkyl groups (e.g., benzene sulfonic acid, o-toluene sulfonic acid, p-toluene sulfonic acid or dodecylbenzene sulfonic acid); cycloalkane sulfonic acids (e.g., camphor sulfonic acid or tetrafluoroborates, hexafluorophosphates, perchlorates, hexafluoroantimonates, hexafluoroarsenates or hexachloroantimonates); and so forth. Particularly suitable counteranions are polymeric anions, such as a polymeric carboxylic or sulfonic acid (e.g., polystyrene sulfonic acid ("PSS")). The molecular weight of such polymeric anions typically ranges from about 1,000 to about 2,000,000, and in some embodiments, from about 2,000 to about 500,000.

When employed, the weight ratio of such counterions to substituted polythiophenes in a given layer is typically from about 0.5:1 to about 50:1, in some embodiments from about 1:1 to about 30:1, and in some embodiments, from about 2:1 to about 20:1. The weight of the substituted polythiophene referred to in the above-referenced weight ratios refers to the weighed-in portion of the monomers used, assuming that a complete conversion occurs during polymerization.

The dispersion may also contain one or more binders to further enhance the adhesive nature of the polymeric layer and also increase the stability of the particles within the dispersion. The binders may be organic in nature, such as polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid ester, vinyl acetate/acrylic acid ester and ethylene/vinyl acetate copolymers, polybutadienes, polyisoprenes, polystyrenes, polyethers, polyesters, polycarbonates, polyurethanes, polyamides, polyimides, polysulfones, melamine formaldehyde resins, epoxide resins, silicone resins or celluloses. Crosslinking agents may also be employed to enhance the adhesion capacity of the binders. Such crosslinking agents may include, for instance, melamine compounds, masked isocyanates or functional silanes, such as 3-glycidoxypropyltrialkoxysilane, tetraethoxysilane and tetraethoxysilane hydrolysate or crosslinkable polymers, such as polyurethanes, polyacrylates or polyolefins. Other components may also be included within the dispersion as is known in the art, such as dispersion agents (e.g., water), surface-active substances, etc.

If desired, one or more of the above-described application steps may be repeated until the desired thickness of the coating is achieved. In some embodiments, only a relatively thin layer of the coating is formed at a time. The total target thickness of the coating may generally vary depending on the desired properties of the capacitor. Typically, the resulting conductive polymer coating has a thickness of from about 0.2 micrometers ("µm") to about 50 µm, in some embodiments from about 0.5 µm to about 20 µm, and in some embodiments, from about 1 µm to about 5 µm. It should be understood that the thickness of the coating is not necessarily the same at all locations on the anode part. Nevertheless, the average thickness of the coating on the substrate generally falls within the ranges noted above.

The conductive polymer layer may optionally be healed. Healing may occur after each application of a conductive polymer layer or may occur after the application of the entire coating. In some embodiments, the conductive polymer can be healed by dipping the part into an electrolyte solution, and thereafter applying a constant voltage to the solution until the current is reduced to a preselected level. If desired, such healing can be accomplished in multiple steps. For example, an electrolyte solution can be a dilute solution of the monomer, the catalyst, and dopant in an alcohol solvent (e.g., ethanol). The coating may also be washed if desired to remove various byproducts, excess reagents, and so forth.

If desired, the capacitor may also contain other layers as is known in the art. For example, a protective coating may optionally be formed between the dielectric and solid electrolyte, such as one made of a relatively insulative resinous material (natural or synthetic). Such materials may have a specific resistivity of greater than about $10^5$ Ω/cm, in some embodiments greater than about 100, in some embodiments greater than about 1,000 Ω/cm, in some embodiments greater than about $1\times10^5$ Ω/cm, and in some embodiments, greater than about $1\times10^{10}$ Ω/cm. Some resinous materials that may be utilized in the present invention include, but are not limited to, polyurethane, polystyrene, esters of unsaturated or saturated fatty acids (e.g., glycerides), and so forth. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or triglycerides, which have a glycerol backbone with one, two, and three, respectively, fatty acyl residues that are esterified.

For instance, some suitable drying oils that may be used include, but are not limited to, olive oil, linseed oil, castor oil, tung oil, soybean oil, and shellac. These and other protective coating materials are described in more detail U.S. Pat. No. 6,674,635 to Fife, et al., which is incorporated herein in its entirety by reference thereto for all purposes.

The anode part may also be applied with a carbon layer (e.g., graphite) and silver layer, respectively. The silver coating may, for instance, act as a solderable conductor, contact layer, and/or charge collector for the capacitor and the carbon coating may limit contact of the silver coating with the solid electrolyte. Such coatings may cover some or all of the solid electrolyte.

The thickness of the resulting capacitor element may vary as desired, but typically is about 4 millimeters or less, in some embodiments, from about 0.05 to about 2 millimeters, and in some embodiments, from about 0.1 to about 1 millimeter.

Regardless of the particular manner in which the capacitor is formed, it can be connected to terminations as is well known in the art. For example, anode and cathode terminations may be electrically connected to the anode wire(s) and the cathode, respectively. The specific configuration of the terminations may vary as is well known in the art. In one embodiment, for example, the cathode termination may contain a planar portion in electrical contact with a lower surface of the capacitor element and an upstanding portion positioned substantially perpendicular to the planar portion and in electrical contact with a rear surface of the capacitor. To attach the capacitor element to the cathode termination, a conductive adhesive may be employed as is known in the art. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives are described in U.S. Patent Application Publication No. 2006/0038304 to Osako, et al., which is incorporated herein in its entirety by reference thereto for all purposes.

The anode termination may likewise contain a planar portion and an upstanding portion. The upstanding portion may contain a region that carries the anode lead assembly of the present invention. For example, the region may possess a single slot for receiving both the first and second anode lead wires. Alternatively, the region may possess separate slots for each wire. The slot may have any desired shape, such as a U-shape, V-shape, etc. for further enhancing surface contact and mechanical stability of the wires. Any technique may be used to connect the wire(s) to the anode termination, such as resistance welding, laser welding, conductive adhesives, etc. Once the capacitor is attached to the terminations, it is enclosed within a resin casing, which may then be filled with silica or any other known encapsulating material. The width and length of the case may vary depending on the intended application. However, the overall thickness of the casing is typically small so that the resultant assembly may be readily incorporated into low profile products (e.g., "IC cards"). For example, the thickness of the casing may range from about 4.0 millimeters or less, in some embodiments, from about 0.1 to about 2.5 millimeters, and in some embodiments, from about 0.15 to about 2.0 millimeters. Suitable casings may include, for instance, "A", "B", "H", or "T" cases (AVX Corporation). After encapsulation, exposed portions of the respective anode and cathode terminations may be aged, screened, and trimmed. If desired, the exposed portions may be optionally bent twice along the outside of the casing (e.g., at an approximately 90° angle).

As a result of the present disclosure, a capacitor may be formed that exhibits excellent electrical properties as determined by the test procedures described below. For example, the capacitor of the present invention can exhibit an ultralow ESR, such as about 300 milliohms (mΩ) or less, in some embodiments about 100 mΩ or less, in some embodiments from about 0.01 to about 50 mΩ, and in some embodiments, from about 0.1 to about 20 mΩ, determined at a frequency of 100 kHz and a temperature of 23° C.±2° C. In addition, the leakage current, which generally refers to the current flowing from one conductor to an adjacent conductor through an insulator, can be maintained at relatively low levels. For example, the numerical value of the normalized leakage current of a capacitor of the present invention is, in some embodiments, less than about 0.1 μA/μF*V, in some embodiments less than about 0.01 μA/μF*V, and in some embodiments, less than about 0.001 μA/μF*V, wherein μA is microamps and uF*V is the product of the capacitance and the rated voltage.

TEST PROCEDURES

Wire Pull Strength ("WPS")

WPS generally refers to the efficiency of wire insertion before the sintering of the porous anode body. WPS is typically measured in N via a digital push-pull gauge (Jirkaspol SH-20K) at a temperature of 23° C.±2° C.

Equivalent Series Resistance ("ESR")

ESR generally refers to the extent that the capacitor acts like a resistor when charging and discharging in an electronic circuit and is usually expressed as a resistance in series with the capacitor. ESR is typically measured using a Keithley 3330 Precision LCZ meter with Kelvin Leads 2.2 volt DC bias and a 0.5 volt peak to peak sinusoidal signal, at an operating frequency of 100 kHz and temperature of 23° C.±2° C.

Capacitance ("Cap")

The capacitance was measured using a Keithley 3330 Precision LCZ meter with Kelvin Leads with 2.2 volt DC bias and a 0.5 volt peak to peak sinusoidal signal. The operating frequency was 120 Hz and the temperature was 23° C.±2° C.

EXAMPLES 1-2

35,000 μFV/g tantalum powder was pressed into pellets to form a porous body having dimensions of 5.10 mm (length) by 3.70 mm (width) by 0.90 mm (thickness). The tantalum powder was charged into the hopper of a tantalum device automatic molding machine and automatically molded together with a 0.19 mm (width—example 1) and a 0.50 mm (width—example 2) tantalum anode lead wire, which was automatically notched via an additional device inside of the molding machine to manufacture a porous body. The penetration of the wire was 70% of the anode length. This molded body was left standing under reduced pressure at 1,400° C. to obtain a sintered body.

The tantalum anode was anodized at 18V in a liquid electrolyte of 0.1% phosphoric acid to make capacitors with a capacitance of 150 μF at 120 Hz. A conductive polymer coating was then formed by dipping the tantalum anode into a butanol solution of iron (III) toluenesulfonate (Clevios™ C, H.C. Starck) for 5 minutes and consequently into 3,4-ethylenedioxythiophene (Clevios™ M, H.C. Starck) for 1 minute. After 45 minutes of polymerization, a thin layer of poly(3,4-ethylenedioxythiophene) was formed on the surface of the dielectric. The parts were washed in methanol to remove reaction by-products, anodized in a liquid electrolyte, and washed again in methanol. The polymerization cycle was repeated 10 times. The finished parts were completed by conventional assembly technology and measured. A copper-based leadframe was used for finishing of the assembly process. Once the capacitor element was attached, the leadframe was enclosed with encapsulating epoxy resin.

COMPARATIVE EXAMPLES 1-2

Capacitors were formed in the manner described in Examples 1-2, except without the step of notching the anode lead wire. In the case of comparative examples 1-2, the tantalum powder was molded together with a 0.19 mm (width—example 1) and a 0.50 mm (width—example 2) tantalum anode lead wire. Multiple parts (1500) were made in this manner and then tested for electrical performance (i.e., WPS, ESR, and capacitance).

Table 1 summarizes the median outputs of WPS of molded bodies and the median capacitance and ESR for the finished capacitors described in examples 1-2 as compared to comparative examples 1-2.

TABLE 1

|  | WPS [N] | CAP [µF] | ESR [mΩ] |
|---|---|---|---|
| Example 1 | 9.5 | 187 | 13.2 |
| Comparative Example 1 | 3.7 | 184 | 14.1 |
| Example 2 | 23.6 | 182 | 7.7 |
| Comparative Example 2 | 13.4 | 181 | 8.5 |

EXAMPLES 3-4

75,000 µFV/g tantalum powder was pressed into pellets to form a porous body having dimensions of 1.80 mm (length) by 2.40 mm (width) by 1.20 mm (thickness). The tantalum powder was charged into the hopper of a tantalum device automatic molding machine and automatically molded together with a 0.17 mm (width—example 3) and 0.50 mm (width—example 4) tantalum anode lead wire, which was automatically notched via an additional device inside of the molding machine to manufacture a porous body. The penetration of the wire was 75% of the anode length. This molded body was left standing under reduced pressure at 1,300° C. to obtain a sintered body.

The tantalum anode was anodized at 15V in a liquid electrolyte of 0.1% phosphoric acid to make capacitors with a capacitance of 150 µF at 120 Hz. A conductive polymer coating was then formed by dipping the tantalum anode into a butanol solution of iron (III) toluenesulfonate (Clevios™ C, H.C. Starck) for 5 minutes and consequently into 3,4-ethylenedioxythiophene (Clevios™ M, H.C. Starck) for 1 minute. After 45 minutes of polymerization, a thin layer of poly(3,4-ethylenedioxythiophene) was formed on the surface of the dielectric. The parts were washed in methanol to remove reaction by-products, anodized in a liquid electrolyte, and washed again in methanol. The polymerization cycle was repeated 10 times. The finished parts were completed by conventional assembly technology and measured. A copper-based leadframe was used for finishing of the assembly process. Once the capacitor element was attached, the leadframe was enclosed with encapsulating epoxy resin.

COMPARATIVE EXAMPLES 3-4

Capacitors were formed in the manner described in Examples 3-4, except without the step of notching the anode lead wire. In the case of comparative examples 3-4, the tantalum powder was molded together with a 0.19 mm (width—example 1) and a 0.50 mm (width—example 2) tantalum anode lead wire. Multiple parts (1500) were made in this manner and then tested for electrical performance (i.e., WPS, ESR, and capacitance).

Table 2 summarizes the median outputs of WPS of molded bodies and the median capacitance and ESR for the finished capacitors described in examples 3-4 as compared to comparative examples 3-4.

TABLE 2

|  | WPS [N] | CAP [µF] | ESR [mΩ] |
|---|---|---|---|
| Example 3 | 4.9 | 123 | 34.8 |
| Comparative Example 3 | 0.7 | 122 | 38.3 |
| Example 4 | 9.2 | 119 | 25.9 |
| Comparative Example 4 | 1.8 | 118 | 27.1 |

As shown in Table 1 and Table 2, the use of a notched anode lead wire improves (i.e., decreases) the ESR value of a capacitor versus a comparative example where no notched wire was used. Additionally, the use of a notched wire is also associated with a higher WPS.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A solid electrolytic capacitor that comprises a capacitor element, the capacitor element comprising:
    a sintered, porous anode body, wherein a lead assembly is embedded within the anode body, the lead assembly comprising a first lead wire, wherein the first lead wire comprises at least one notch having a length and a width, wherein the notch is located on an embedded portion of the first lead wire, further wherein the notch is an indentation in the first lead wire, wherein the first lead wire has a length of from about 100 micrometers to about 120 millimeters and a width of form about 20 micrometers to about 1000 micrometers, further wherein the length at the first lead wire is from about 1.5 to about 30 times the length of the notch and the width of the first lead wire is from about 1.05 to about 7 times the width of the notch, the first lead wire extending from a surface of the anode body in a longitudinal direction;
    a dielectric layer overlying the sintered porous anode body; and
    a cathode overlying the dielectric layer that includes a solid electrolyte.

2. The solid electrolytic capacitor of claim 1, wherein the notch is rectangular, circular, elliptical, triangular, U-shaped, or V-shaped.

3. The solid electrolytic capacitor of claim 1, wherein the notch is formed by crimping the first lead wire.

4. The solid electrolytic capacitor of claim 1, wherein the first lead wire has an aspect ratio of length to width of from about 2 to about 150.

5. The solid electrolytic capacitor of claim 1, wherein the lead assembly further comprises a second lead wire extending from a surface of the anode body in a longitudinal direction.

6. The solid electrolytic capacitor of claim 5, wherein the second lead wire comprises at least one notch, wherein the notch is located on an embedded portion of the second lead wire.

7. The solid electrolytic capacitor of claim 5, wherein the width of the second lead wire is greater than the width of the first lead wire.

8. The solid electrolytic capacitor of claim 1, wherein the anode body is formed from a powder having a specific charge of from about 20,000 μF*V/g to about 600,000 μF*V/g, wherein the powder comprises a valve metal such as tantalum, niobium, aluminum, hafnium, titanium, an electrically conductive oxide thereof, or an electrically conductive nitride thereof.

9. The solid electrolytic capacitor of claim 1, further comprising an anode termination that is electrically connected to the lead assembly, a cathode termination that is electrically connected to the cathode, and a molding material that encapsulates the capacitor element and leaves exposed at least a part of the anode termination and at least a part of the cathode termination.

10. A method for forming a sintered, porous anode body, the method comprising:

forming at least one notch having a length and width on a portion of a first lead wire of an anode lead assembly, wherein the notch is an indentation in the first lead wire, wherein the first lead wire has a length of from about 100 micrometers to about 120 millimeters and a width of from about 20 micrometers to about 1000 micrometers further wherein the length of the first lead wire is from about 1.5 to about 30 times the length of the notch and the width of the first lead wire is from about 1.05 to about 7 times the width of the notch;

embedding the anode lead assembly within a powder formed from a valve metal composition so that the portion of the wire, wherein the at least one notch is formed is embedded within the powder;

compacting the powder around the lead assembly; and sintering the compacted powder and the lead assembly to form the porous anode body.

11. The method of claim 10, wherein the notch is formed by crimping the first lead wire.

12. The method of claim 10, wherein the notch is rectangular, circular, elliptical, triangular, U-shaped, or V-shaped.

13. The method of claim 10, wherein the anode lead assembly comprises a second lead wire.

14. The method of claim 13, wherein the second lead wire comprises at least one notch, wherein the notch is located on an embedded portion of the second lead wire.

15. A method for forming a solid electrolytic capacitor element, the method comprising:

anodically oxidizing the sintered, porous anode body of claim 10 to form a dielectric layer; and applying a solid electrolyte to the anodically oxidized sintered anode body.

* * * * *

UNITED STATES PATENT AND TRADEMARK OFFICE
CERTIFICATE OF CORRECTION

PATENT NO. : 8,947,858 B2  
APPLICATION NO. : 13/454370  
DATED : February 3, 2015  
INVENTOR(S) : Lotfi Djebara and Jiri Kobza It is certified that error appears in the above-identified patent and that said Letters Patent is hereby corrected as shown below:

In the Claims

Claim 1 (column 18, line 46)

"...millimeters and a width of form about 20 micrometers to..." should read --...millimeters and a width of from about 20 micrometers to...--

Claim 1 (column 18, line 47)

"...about 1000 micrometers, further wherein the length at..." should read --about 1000 micrometers, further wherein the length of...--

Claim 10 (column 20, line 1)

"...from about 20 micrometers to about 1000 micrometers..." should read --from about 20 micrometers to about 1000 micrometers,...--

Signed and Sealed this  
Twenty-eighth Day of July, 2015

Michelle K. Lee  
*Director of the United States Patent and Trademark Office*